United States Patent
Hogg et al.

(10) Patent No.: US 9,849,552 B2
(45) Date of Patent: Dec. 26, 2017

(54) APPARATUS FOR GUIDING TUBE PROCESSING DEVICES

(71) Applicant: Georg Fischer Wavin AG, Schaffhausen (CH)

(72) Inventors: Christian Hogg, Wutach (DE); Karl-Heinz Mayer, Singen (DE); Michael Tinius, Ulm (DE)

(73) Assignee: Georg Fischer Wavin AG, Schaffhausen (CH)

( * ) Notice: Subject to any disclaimer, the term of this patent is extended or adjusted under 35 U.S.C. 154(b) by 380 days.

(21) Appl. No.: 13/908,614

(22) Filed: Jun. 3, 2013

(65) Prior Publication Data
US 2013/0334751 A1    Dec. 19, 2013

(30) Foreign Application Priority Data
Jun. 19, 2012  (EP) ..................... 12172509

(51) Int. Cl.
| | |
|---|---|
| *B23D 21/00* | (2006.01) |
| *B23Q 9/02* | (2006.01) |
| *B23D 21/04* | (2006.01) |
| *B23D 9/00* | (2006.01) |
| *B23D 79/06* | (2006.01) |
| *B23D 79/10* | (2006.01) |
| *B23K 37/053* | (2006.01) |
| *B23K 31/02* | (2006.01) |
| *B23K 101/06* | (2006.01) |

(52) U.S. Cl.
CPC ............. *B23Q 9/02* (2013.01); *B23D 9/00* (2013.01); *B23D 21/04* (2013.01); *B23D 79/06* (2013.01); *B23D 79/10* (2013.01); *B23K 31/027* (2013.01); *B23K 37/0536* (2013.01); *B23K 2201/06* (2013.01)

(58) Field of Classification Search
CPC ...... B23D 21/00; B23D 21/04; B23D 45/006; B23D 45/12; B23D 45/126; B24B 27/0616
USPC ....................... 30/101, 102, 92–97
See application file for complete search history.

(56) References Cited

U.S. PATENT DOCUMENTS

| | | | | |
|---|---|---|---|---|
| 1,967,496 | A * | 7/1934 | Carr | F16G 13/06 198/851 |
| 2,291,395 | A * | 7/1942 | Levey | 30/97 |
| 2,807,921 | A * | 10/1957 | Smith et al. | 451/441 |
| 3,688,615 | A * | 9/1972 | Protze | B23D 45/126 125/14 |
| 3,704,516 | A * | 12/1972 | Ono | 30/96 |
| 3,942,248 | A * | 3/1976 | Sherer et al. | 30/97 |
| 4,373,125 | A * | 2/1983 | Kazlauskas | 219/60 A |
| 4,490,909 | A * | 1/1985 | Wachs et al. | 30/97 |

(Continued)

FOREIGN PATENT DOCUMENTS

DE     202007016022 U1    3/2009
EP           0427453 A1 *  5/1991

(Continued)

*Primary Examiner* — Larry E Waggle, Jr.
*Assistant Examiner* — Tyrone V Hall, Jr.
(74) *Attorney, Agent, or Firm* — Bachman & LaPointe, P.C.

(57) ABSTRACT

An apparatus for guiding tube processing devices, in particular planing devices, wherein the apparatus is arranged on an outer circumference of the tube to be processed, wherein the apparatus has at least two bands which extend in parallel.

17 Claims, 3 Drawing Sheets

(56) References Cited

U.S. PATENT DOCUMENTS

| | | | | |
|---|---|---|---|---|
| 4,493,150 A | * | 1/1985 | Garcia et al. | 30/97 |
| 5,081,768 A | * | 1/1992 | Brennan et al. | 30/101 |
| 5,461,851 A | * | 10/1995 | Lehrieder | B41F 13/03 198/851 |
| 6,244,189 B1 | * | 6/2001 | Kingsley | B23K 37/0294 104/119 |
| 6,843,328 B2 | * | 1/2005 | Boyl-Davis | B23Q 1/26 173/31 |
| 7,047,850 B2 | | 5/2006 | Merle | |
| 7,387,601 B2 | * | 6/2008 | Beck | B41F 13/03 226/91 |
| 7,607,376 B2 | | 10/2009 | Merle | |
| 8,481,882 B2 | * | 7/2013 | Kastelein et al. | 219/60 A |
| 8,667,693 B2 | * | 3/2014 | Ellis | B23D 45/12 30/102 |
| 2004/0035171 A1 | * | 2/2004 | Gormany | B23K 7/006 72/125 |

FOREIGN PATENT DOCUMENTS

| | | | | |
|---|---|---|---|---|
| EP | 1487600 B1 | | 12/2005 | |
| EP | 1306149 B1 | | 9/2006 | |
| EP | 1854578 A2 | | 11/2007 | |
| GB | 2316903 A | * | 3/1998 | |
| WO | 9817980 A1 | | 4/1998 | |
| WO | WO 2010085621 A1 | * | 7/2010 | B23B 5/163 |
| WO | 2011073660 A1 | | 6/2011 | |

\* cited by examiner

APPARATUS FOR GUIDING TUBE PROCESSING DEVICES

BACKGROUND OF THE INVENTION

The invention relates to an apparatus for guiding tube processing devices, in particular planing devices, wherein the apparatus is to be arranged on the outer circumference of the tube to be processed.

Remachining work which serves for connecting further lines or branches, is often carried out on plastic tubes or plastic pipework.

For example, to fit branch sockets or welding saddles which are welded to the main line, it is necessary to plane off the outer surface of the tube at the weld point in order to remove dirt inclusions from the production process or even material changes brought about by ageing which, for example, can occur on the surface of the tube as a result of UV damage or weather.

In addition, an oxide film is formed when plastic tubes are stored. An oxide film is just as troublesome when welding tubes, as welding without removing the oxide film by scraping it off can result in a non-tight weld seam.

Processing the outer surface of a plastic tube prior to further processing, in particular prior to welding, is essential for achieving welding that is fit for requirements.

It can also be the case that a bore is to be provided in the main line subsequently in order to fit corresponding branch sockets.

EP 1 306 149 B1 discloses a planing device for tubular objects, having at least one supporting means for supporting the object to be planed, a planing unit which has a planing head, a guiding module and a carrier unit. The planing head is pivotable about an axis, as a result of which the tube is planed off in a uniform manner without there remaining any non-planed places.

A disadvantage of said planing device is that it can only be used for one diameter dimension. For planing pipework with wider or other diameter dimensions, the supporting means on the planing device has to be replaced by a supporting means which corresponds to the diameter.

EP 1 487 600 B1 discloses a planing apparatus which is suitable for different tube diameters. The apparatus is mounted around the tube circumference and then rotated about the circumference, as a result of which the tube is planed. Said planing device is only suitable for plastic tubes which have a smaller diameter which can still be handled. It is not suitable for large-dimensioned plastic tubes which are used, for example, as gas lines.

DE 20 2007 016 022 U1 describes a planing device for large-dimensioned plastic tubes. The planing device is tensioned around the tube circumference by means of a link chain and a tensioning band. A stop towards the end face defines the position of the planing device. The electric plane, which is used as a planing device, guided by the stop and stabilized by the link chain, is pushed or rotated over the surface of the tube.

A disadvantage of said planing device is that it is only suitable for processing at the edge of a tube and not in the middle of an installed pipeline as the device requires a stop which abuts against the end face of the tube and, as a result, determines the spacing and takes over the guiding of the plane.

A disadvantage of the above-mentioned disclosures is also that the apparatuses can only be used in each case for one application, namely for the planing of the tubes. For further processing such as, for example, providing a bore in a plastic tube, another apparatus is required.

It is the object of the invention to propose an apparatus which is suitable for tube diameters of between 300 and 2000 mm without having to carry out any redesigning of the apparatus. In addition, different tube processing devices should be mountable on the apparatus in order to be able to carry out different processing operations with the same apparatus. When a planing device is used in combination with the present invention, a uniform, constant planing is to be achieved by the use of the present invention. It must be ensured by means of the apparatus according to the invention that the planed plastics material is removed to the same depth even in the case of oval tubes.

SUMMARY OF THE INVENTION

The foregoing object is achieved according to the invention in that the apparatus has at least two bands which extend in parallel. The bands have a flat rectangular cross section. The bands are preferably produced from a spring steel, other metallic materials also being conceivable. Plastic bands or fibre-reinforced plastic bands are also suitable. The bands have to have the characteristic of adapting to the circumference of the tube in a precise fitting manner, i.e. that they are easily positioned along the circumference of the tube, the bands being suitable for tubes with diameters of between 300 and 2000 mm and consequently being generally usable for all diameters. The two bands are preferably produced from the same material. The bands have the characteristic of being stiff against torsion, which means that they can hardly be distorted along their length, neither in the extended state nor in the mounted state. However, the bands have a high degree of flexibility along their length or they can easily be elastically deformed or bent. In addition, the material used has to have a high degree of tensile strength.

The bands are connected to a carrier at their ends. The carrier extends at right angles with respect to the bands and connects them together. The two ends of the bands which extend in parallel and are located side by side, are connected together by means of a carrier. A type of frame which can be positioned around the circumference of the plastic tube to be worked is formed as a result. The present invention can be used for different tube diameters as a result of the adaptability of the bands. As already mentioned previously, the present invention is suitable for plastic tubes which have a diameter which lies within the range of between 300-2000 mm.

The bands connected by the carrier and the stiffness against torsion of the bands makes the frame per se stiff or stiff against torsion. The flexibility of the frame exists only in the adaptability of the bands to the circumference of the tube. A steel or aluminium profile is preferably used as the carrier. The connection between the band ends and the carrier is preferably formed by a carrier accommodating means. The carrier is connected, preferably by means of screw connection, to the carrier accommodating means on the respective end, as a result the apparatus according to the invention can be dismantled into its individual parts for transport purposes and can be re-assembled prior to its use. The bands are also connected to the carrier accommodating means, as a result of which the frame is formed. It is also possible to fasten the bands directly on the carrier without using a carrier accommodating means.

As the bands serve as a guiding means of a tube processing device, it is expedient for them not to abut directly against the circumference of the tube to be processed so that the tube processing device can also be fastened to the bands in a corresponding manner. To distance the bands from the outer circumference of the tube, spacers are arranged on the band underside. The spacers are preferably in the form of a cylinder, it also being possible to use spacers which have another form. It is important in this respect that the bands are always at the same spacing from the outer circumference or from the surface of the tube, this in turn ensures the surface is uniformly planed by a planing device even if the tube has an oval form.

It is advantageous when the spacers are smaller in length than the bands are wide. As a result, the correspondingly mounted tube processing device can be guided in an optimal manner by the bands being wrapped around by the device or slide and thus being guided precisely by a positive-locking connection.

The frame, which is formed by the bands, carriers and preferably the carrier accommodating means, is preferably fastened on the outer circumference of the tube to be processed by means of a tensioning device. Lashing straps can be used for fastening as a simple and cost-efficient solution. The lashing straps are fastened on the carrier accommodating means or directly on the carriers when no carrier accommodating means have been used. By tightening the lashing straps, the frame is tensioned around the circumference of the tube such that the bands, spaced by the spacers, are positioned along the circumference.

BRIEF DESCRIPTION OF THE DRAWINGS

One exemplary embodiment of the invention is described by way of the figures, the invention not being restricted to only the exemplary embodiment, in which.

DETAILED DESCRIPTION

Figure 1:
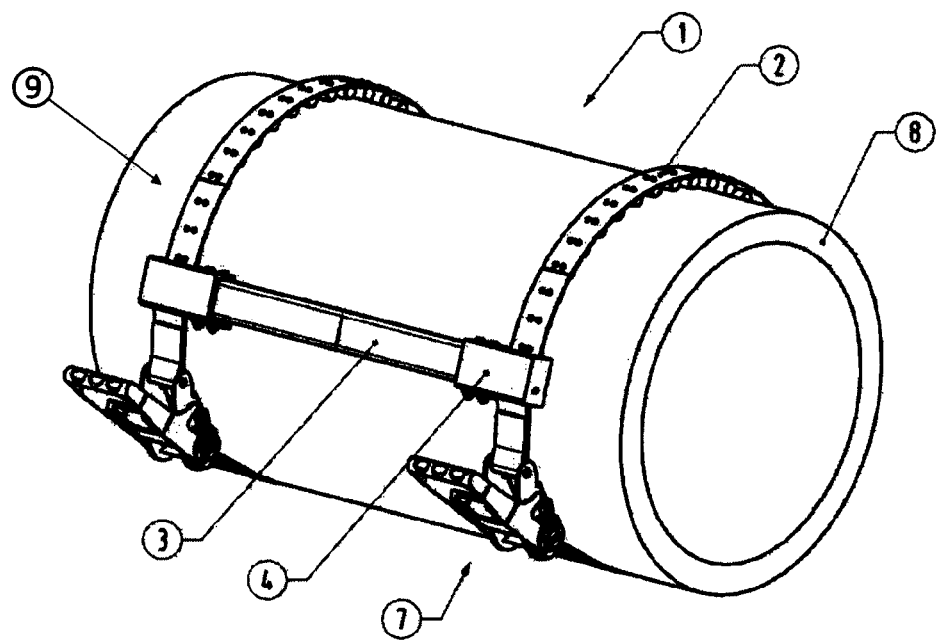
FIG. 1 shows a 3D view of an apparatus according to the invention mounted on the outer circumference of a tube.

FIG. 1 shows the apparatus according to the invention mounted on the circumference. The two bands 2, which are preferably of spring steel, adapt to the course of the circumference of the tube 8. The material of the bands 2 is selected such that it has a high degree of torsional strength as well as being stiff to torsion, that means that the bands 2 can hardly be deformed along their length, however, they adapt easily to the circumference of the tube 8 by means of their high degree of flexibility along their length. By means of the spacers 5 which are arranged on the band underside 6, the band is at a constant spacing from the outer circumference of the tube 8 or from the surface thereof. The two bands 2 of the apparatus extend parallel with respect to one another. The band ends of the two bands 2, which are located on the same side of the circumference or which are located side by side, are in each case connected together by means of a carrier 3. The apparatus 1 forms, as a result, a type of frame 9 which is positioned over the outer circumference of the tube 8 for processing the tube 8. As can be seen from FIG. 1, the bands 2 adapt precisely to the course of the circumference of the tube 8. As a result the spacing between the band 2 and the circumference of the tube 8, which is generated by the spacers 5, is the same size at any position. When using a planing device 11 in combination with the apparatus 1 according to the invention, it is thereby ensured that the planing depth is given at every position, in addition non-planed regions can be avoided even in the case of tubes 8 which have an oval form. The band ends are preferably connected to the respective carrier 3 by means of a carrier accommodating means 4.

Figure 2:
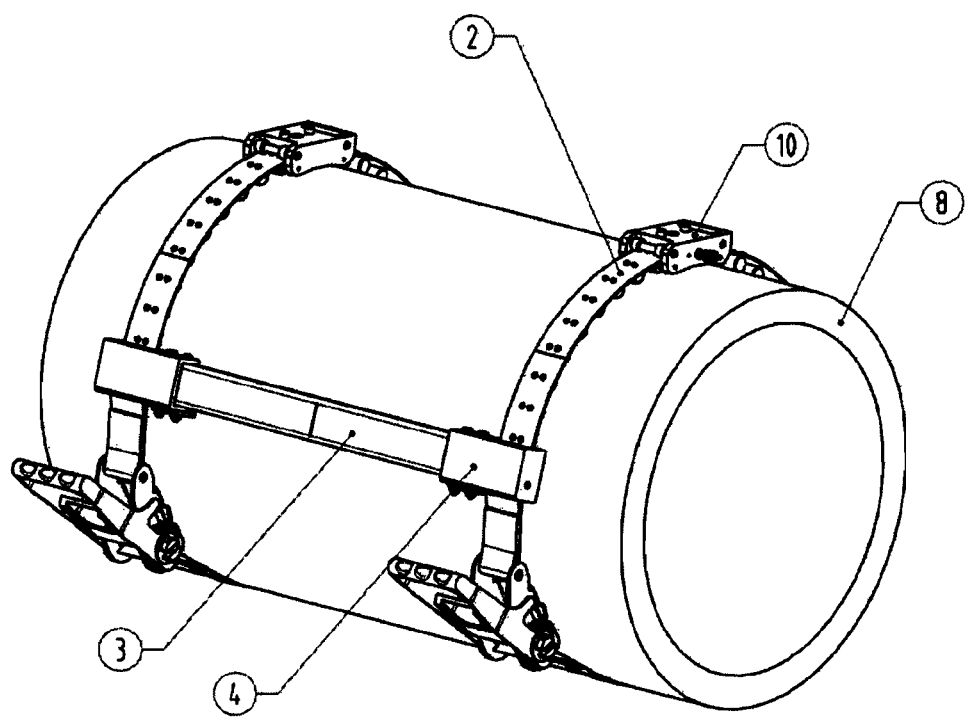
FIG. 2 shows a 3D view of an apparatus according to the invention with slides.

As an alternative to this, the band ends can also be mounted directly on the carrier 3. Carrier accommodating means 4, which enable the bands 2 to be connected to the respective carrier 3, are arranged on both ends of the carrier 3, which is preferably formed by a steel or aluminium profile. The carrier accommodating means 4 are preferably screw-connected to the carriers 3. The connection of the bands 2 and the carrier 3 together to form a type of frame 9, which is positioned over the circumference of a tube 8 and is fastened by means of a tensioning device, achieves a rigidity of the apparatus which enables it to attach tube processing devices, in particular planing devices 11, on the apparatus 1 which neither tilt nor lift in an unwanted manner from the outer circumference of the tube 8 when they are being used. FIG. 2 shows the optimum slide guiding means for the slides 10 on which a tube processing device can be fastened. The slide guiding means extends along the bands 2, which through their material, their carrier connection and the fastening by means of a tensioning device, run rigidly and parallel to the circumference. The fastening of the apparatus 1 according to the invention on the outer circumference of the tube 8 is converted by a tensioning device, preferably by two lashing straps 7, which are fastened on the frame 9. In the embodiment shown in FIG. 1, the lashing straps 7 are fastened on the carrier accommodating means 4, but can also be attached directly on the carrier 3 if there are no carrier accommodating means 4 present.

The frame 9 is fastened on the outer circumference of the pipeline 8 to be processed by means of a ratchet or an alternative tensioning device.

FIG. 2 shows the apparatus 1 according to the invention with the slides 10 which are mounted on the bands 2 which serve as guiding means for the slides 10. The corresponding tube processing device is positioned and fastened on the slides. A planing device 11, which is mounted on the slides 10, is shown as a possible embodiment in FIG. 4. It is also possible to fasten other pipe processing devices on the slides 10, for example in order to provide bores in the tubes 8.

Figure 3:
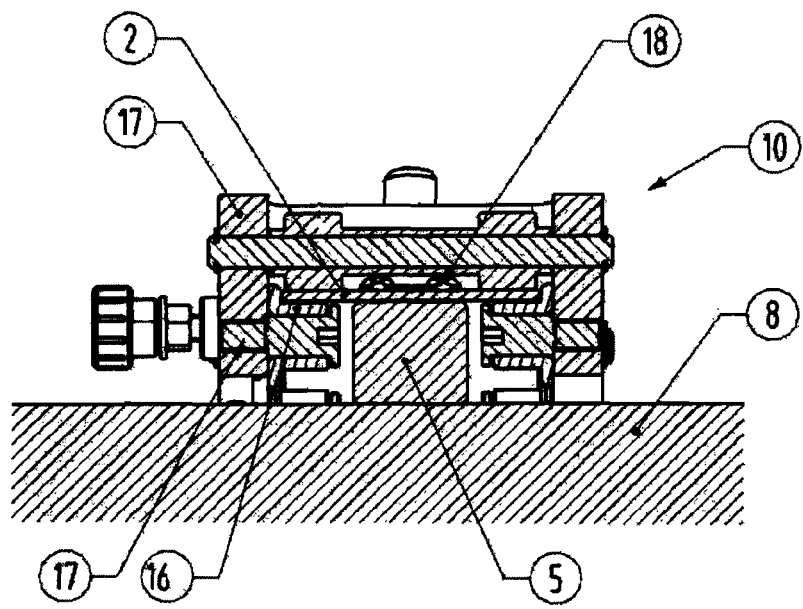
FIG. 3 shows a sectional view through a slide arranged on a band.

FIG. 3 shows a sectional view through a slide 10 which is fastened on the band 2. The spacers 5 are fastened on the band underside 6 and are preferably realized as cylindrical bodies, however bodies which are formed in another manner can also be used as spacers 5. The spacers 5 are arranged at regular spacings with respect to one another on the band underside 6 by means of fastening means 18. The spacers 5 preferably do not extend over the entire width of the band 2. As a result, the slide 10 can be guided in an optimum manner by the rollers 16 of the slide 10 arranged on the axles 15 being arranged for guiding purposes on the two edges of the band underside 6 or the slide 10 surrounding the band 2 in a positive locking manner. As a result, the slide 10 is guided in an axial manner. The axles 15 are preferably fastened by means of screw connection in the base frame 17 of the slide 10.

Figure 4:
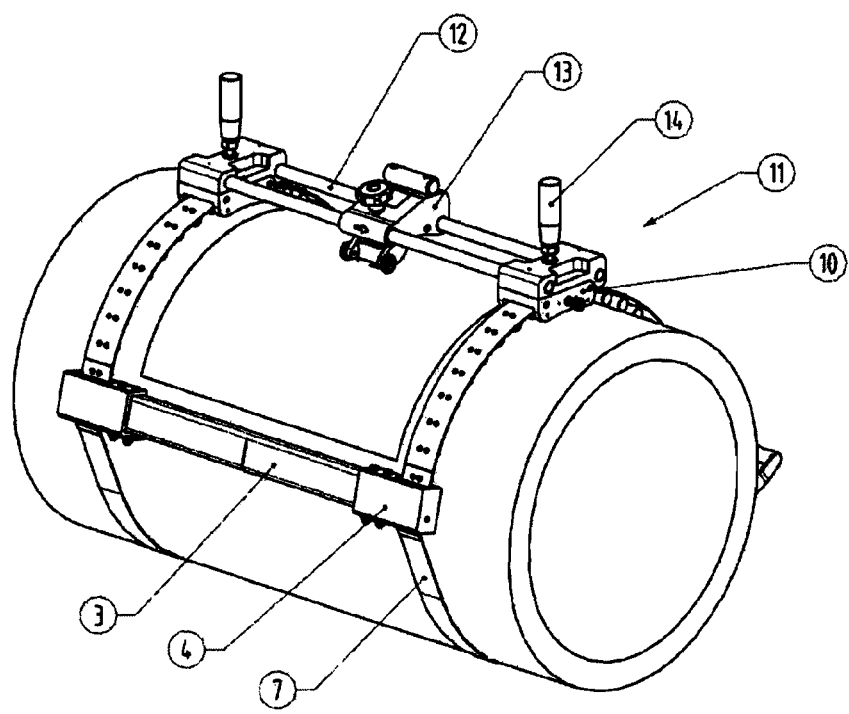
FIG. 4 shows a 3D view of an apparatus according to the invention with a planing device as the tube processing device and FIG. 5 shows a 3D view of an apparatus according to the invention, the apparatus being used as a vice.

FIG. 4 shows the apparatus 1 according to the invention, on which a planing device 11 is arranged as an example of a tube processing device. It is also possible to attach other tube processing devices on the apparatus 1 according to the invention in order, for example, to provide bores in a tube 8. The planing device 11 has two slides 10 which are guided along the bands 2. The slides 10 are connected together by means of two connecting axles 12. A plane 13, which is displaced along the connecting axles 12 and can be fixed at the desired position in order then to move the planing device 11 along the circumference or to pivot it in order to carry out a planing process, is arranged on the connecting axles 12. The handles 14 serve for pushing the planing device 11 along the circumference of the tube 8. The apparatus 1 according to the invention achieves rigid guiding of the tube processing device or planing device 11, as a result tilting and canting of the plane 13 or of the complete planing device 11 or of a tube processing device is avoided. The plane 13, as a result, is always at the same spacing from the circumference or the surface of the tube 8 even in the case of ovality. After pivoting over a region of the circumference, which extends at a maximum from carrier 3 to carrier 3, the plane 13 is displaced axially along the connecting axles 12 in order to perform a further planing process. The planing operation runs radially, as a result of which planed paths are strung together until the desired region is planed. In the case of larger regions, it is possible to displace the apparatus 1 along the pipeline 8.

Figure 5:
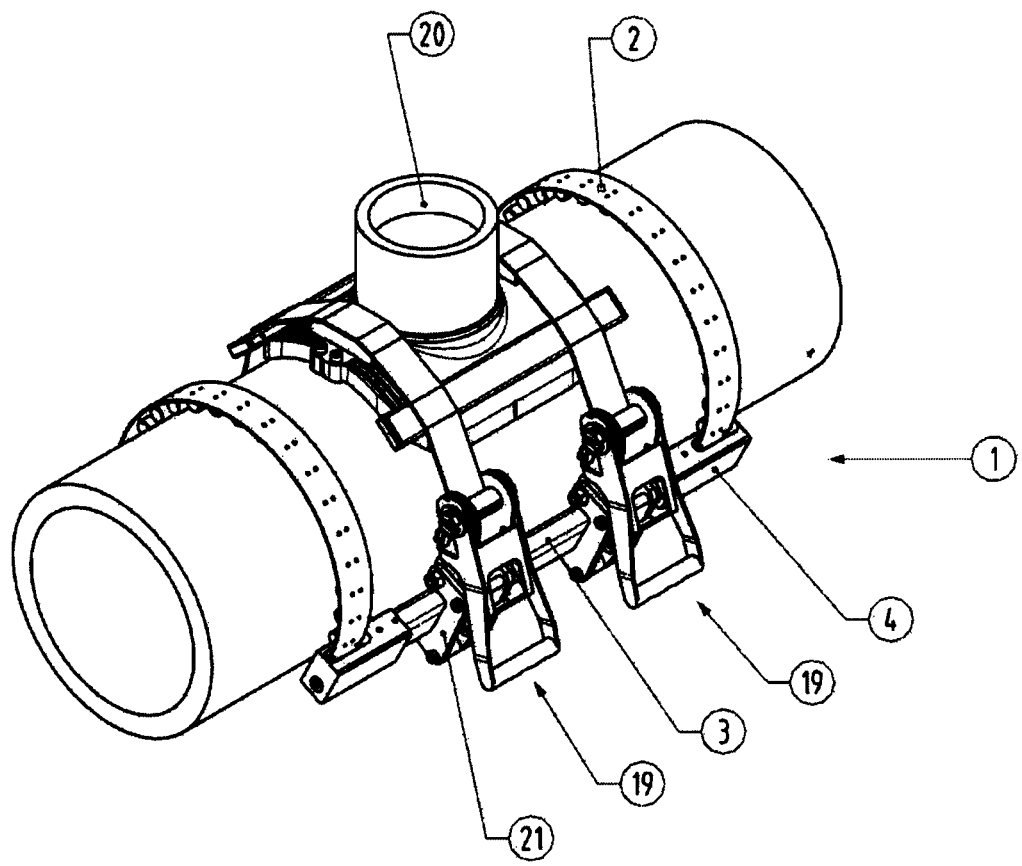

FIG. 5 shows a further possibility of use of the apparatus according to the invention. The apparatus 1 is used as a tensioning frame in FIG. 5, to this end two tensioning elements 19, preferably lashing straps which fix the fitting 20 to be welded on the tube 8, are fastened on the apparatus 1 which is mounted on the circumference of the tube 8. The tensioning elements 19 are preferably fastened on the carrier 3, which creates the advantage that the tensioning elements 19 do not have to be positioned around the complete tube circumference, but can be mounted simply and quickly on the carriers 3 by means of brackets 21.

The invention claimed is:

1. An apparatus arranged on an outer circumference of a tube for guiding a tube processing device along the outer circumference, wherein the apparatus comprises:
    at least two bands which extend parallel to each other and spaced apart to leave the tube processing device access to the tube between the bands and comprising a first band and a second band, the first band and the second band being flexible to conform to the outer circumference;
    a tensioning device for tensioning the bands; and
    at least two slides on which the tube processing device may be fastened and comprising a first slide mounted on and guided by the first band and a second slide mounted on and guided by the second band.

2. An apparatus according to claim 1, wherein the bands are formed from a metallic material.

3. An apparatus according to claim 2, wherein the bands are formed of a spring steel.

4. An apparatus according to claim 1, wherein each of the bands has an end and the bands are connected at the ends by a carrier.

5. An apparatus according to claim 4, wherein the ends of the two bands lie side by side and are connected by way of the same carrier.

6. An apparatus according to claim 5, wherein the bands are fastened on the carrier by a carrier accommodating means.

7. An apparatus according to claim 1, wherein each band has an underside and spacers are arranged on the underside of the bands.

8. An apparatus according to claim 7, wherein the spacers are in the form of a cylinder.

9. An apparatus according to claim 7 wherein the spacers hold each band spaced away from the tube.

10. An apparatus according to claim 1, wherein the apparatus is fastened on the outer circumference of the tube by the tensioning device.

11. An apparatus according to clam 10, wherein
    A first said tensioning device fastens the first band and a second said tensioning device fastens the second band; and
    the first band and the second band flexible to conform to the outer circumference when tension is applied by the associated said tensioning device.

12. An apparatus according to claim 1, wherein
    the first band and the second band each comprise a first edge and a second edge and an underside having a first edge portion and a second edge portion; and
    the apparatus further comprises spacers arranged on the underside of the first band and the underside of the second band to hold each band spaced away from the tube.

13. An apparatus according to claim 12, wherein
    the first band first edge and the first band second edge are longitudinally opposite each other; and
    the second band first edge and the second band second edge are longitudinally opposite each other.

14. An apparatus according to claim 1, further comprising the tube processing device, the tube processing device being longitudinally displaceable between the first band and the second band.

15. An apparatus according to claim 14, further comprising
    a pair of axles between the slides and carrying the tube processing device.

16. An apparatus according to claim 14, wherein the tube processing device is a planing device.

17. An apparatus arranged on an outer circumference of a tube for planning the outer circumference, wherein the apparatus comprises:
    a planning device;
    at least two bands which extend parallel to each other and spaced apart to leave the planing device access to the tube between the bands and comprising a first band and a second band, the first band and the second band being flexible to conform to the outer circumference;
    a tensioning device for tensioning the bands; and
    at least two slides on which the planing device may be fastened and comprising a first slide mounted on and guided by the first band and a second slide mounted on and guided by the second band.

* * * * *